No. 792,617. PATENTED JUNE 20, 1905.
B. W. RICE.
APPARATUS FOR SAVING PRECIOUS VALUES IN SOILS.
APPLICATION FILED JAN. 23, 1905.
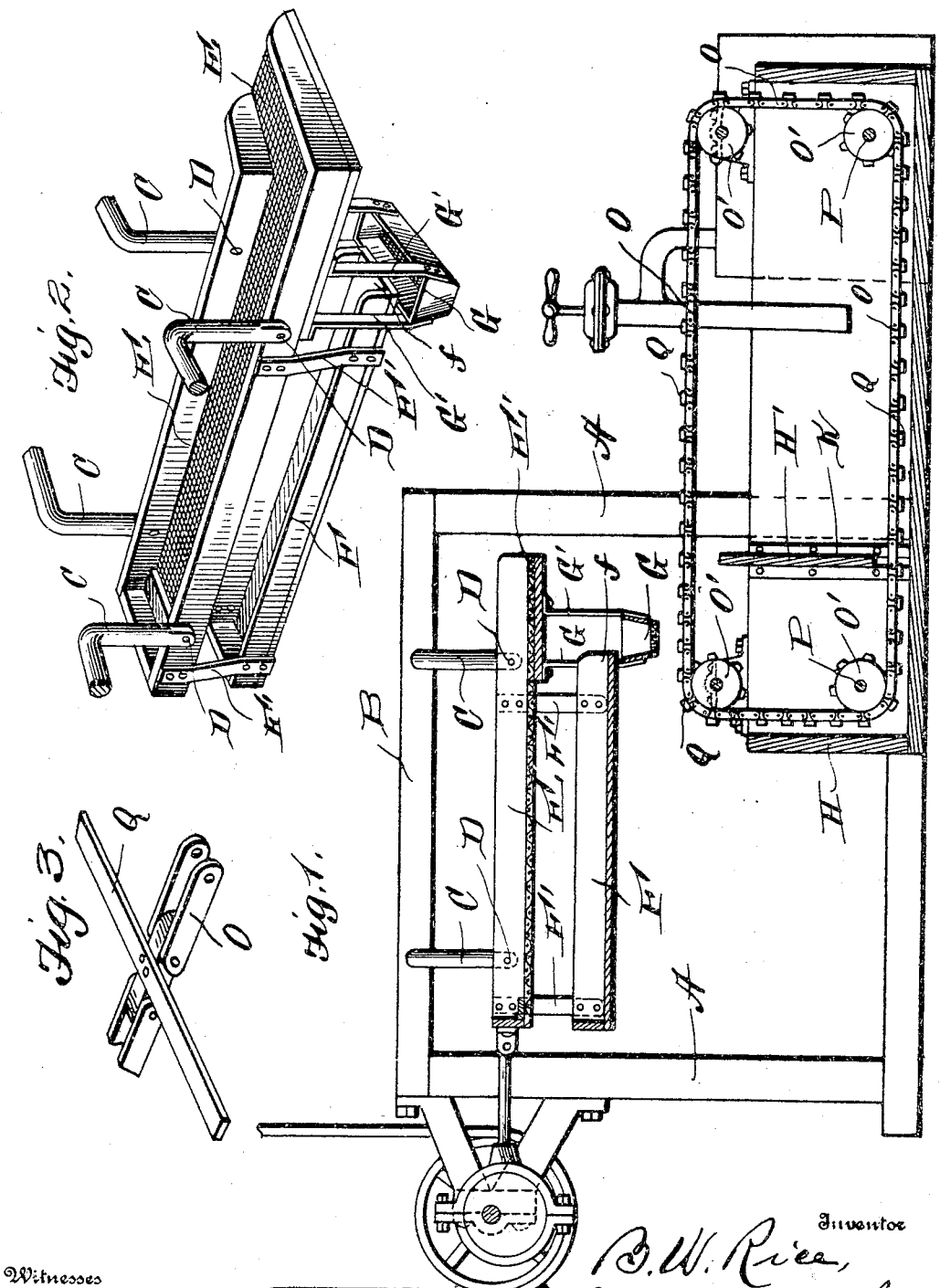

No. 792,617.

Patented June 20, 1905.

UNITED STATES PATENT OFFICE.

BENJAMIN WM. RICE, OF CALDWELL, IDAHO.

APPARATUS FOR SAVING PRECIOUS VALUES IN SOILS.

SPECIFICATION forming part of Letters Patent No. 792,617, dated June 20, 1905.

Application filed January 23, 1905. Serial No. 242,370.

*To all whom it may concern:*

Be it known that I, BENJAMIN WM. RICE, a citizen of the United States, residing at Caldwell, in the county of Canyon and State of Idaho, have invented certain new and useful Improvements in Apparatus for Saving Precious Values in Soils; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for saving the precious values in soils; and the object of the invention is to produce a simple and efficient means whereby flour-gold may be separated from foreign substances and saved.

My invention comprises various details of construction and combinations and arrangements of parts, which will be hereinafter fully described and then specifically defined in the appended claim.

I illustrate my invention in the accompanying drawings, which, with the letters of reference marked thereon, form a part of this application, and in which—

Figure 1 is a sectional view through my improved apparatus. Fig. 2 is a perspective view of a portion of the apparatus, showing the relative positions of the shaking-screens; and Fig. 3 is an enlarged detail view of a portion of the endless chain having stirrer-fingers thereon.

Reference now being had to the details of the drawings by letter, A designates uprights supporting cross-pieces B, one of which is shown in Fig. 1 of the drawings, and C designates hangers, which are journaled in said cross-pieces and have their lower ends pivotally mounted, as at D, to the sides of the screen E. Said screen is open at its lower exit end E' and supports a trough F by means of bars F', as shown clearly in Figs. 1 and 2 of the drawings. Said trough has an exit end *f* positioned a slight distance back from the overhanging end of the screen E and is located adjacent to a screen-box G, which latter is supported, by means of bars G, on the under side of the screen E and is so positioned that it will receive the discharge of water and slime containing the precious metals from the trough F. The exit end of the screen E overhanging the end of the trough and also of the screen-box G provides means for allowing the foreign matter to fall from the screen E without entering the screen-box G.

H designates an elongated trough with closed ends, and H' is a vertically-adjustable partition mounted between the cleats K and is adapted to be raised or lowered to regulate the flow of water and metallic substances in the bottom of the trough. An endless chain O is mounted on the sprocket-wheels O', which are carried upon the shafts P, mounted as shown in Fig. 2 of the drawings. The links of said chain carry fingers Q, an enlarged detail view of one being shown in Fig. 3 of the drawings, which are provided for the purpose of agitating the water and breaking up the particles of oil as the endless chain travels through the trough containing the water, oil, and metallic values. The trough H is so positioned that it will receive the discharge from the screen-box G, and the slimes containing the values falling upon the endless chain will be carried by the latter, which moves in the direction indicated by the arrow in Fig. 2 of the drawings, and deposited in the tank H, and as the movement of the chain will be slow the values and particles of oil which take up the flour-gold will be agitated and drawn from one end of the tank to the other. The bubbles of air and oil and the precious values of metal will be suspended in the water in the trough H in which oil has been previously inserted, and the action of the fingers upon the chain will serve the purpose of chopping up the bubbles as the fingers move from one end of the trough to the other. Said fingers will also serve to roll and advance the screenings on the bottom of the trough, whereby the same will be thoroughly washed and will be caused to liberate any oil that may go with the solid material into the large trough. It is essential that the water in the trough carrying the bubbles must be chopped up before it is dismissed to the ground, and this chopping or agitating must be done as far as possible from the exit in order to give the oil a chance to again seek the surface of the water in the trough. The values will float on the surface of the water in the trough and may be removed therefrom by means of a pump that constantly lifts the slimes into a second trough or drain-box, where the products may be taken to a filter (not shown) and where the solid material may be filtered out, allowing the clean oil to be used again.

By the construction of apparatus embodying my invention I have found that an effectual means is produced for the saving of flour-gold from gravel and sand without the wasting of the oil which is utilized in taking up the fine particles of the values.

While I have shown a particular construction of apparatus illustrating my invention, it will be understood that I may vary the details of the same, if desired, without in any way departing from the spirit of the invention.

Having thus fully described my invention, what I claim as new, and desire to secure by Letters Patent, is—

An apparatus for saving metallic values from sand, gravel, &c., comprising a shaking-screen, a trough supported by arms secured to said screen, a screen-box, bars supported by said screen and positioned underneath the exit end of said trough, a tank adapted to contain water and oil and positioned underneath said screen-box, sprocket-wheels mounted within and upon the upper edge of said tank, a sprocket-chain traveling about said wheels, cross-pieces secured at intervals to the links of said chain and projecting laterally from the sides of the chain and adapted to travel adjacent to the bottom of the tank substantially its entire length, and a gate positioned within said tank and underneath which said cross-pieces upon the chain are adapted to travel, as shown and described.

In testimony whereof I hereunto affix my signature in presence of two witnesses.

BENJAMIN WM. RICE.

Witnesses:
SAMUEL H. CLAY,
J. M. THOMPSON.